United States Patent Office 2,752,947
Patented July 3, 1956

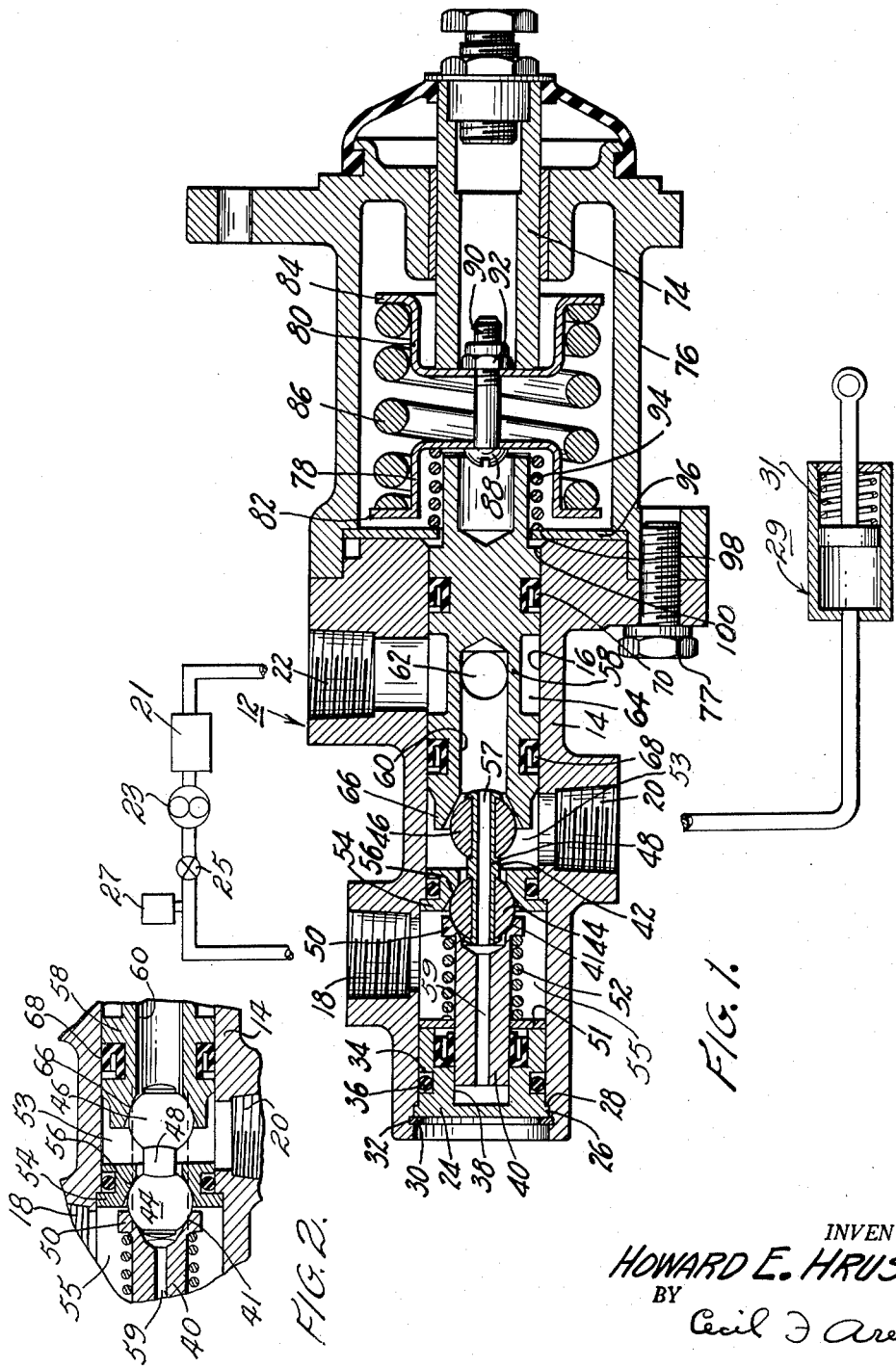

2,752,947
BALANCED VALVE

Howard E. Hruska, South Bend, Ind., assignor to Bendix Aviation Corporation, South Bend, Ind., a corporation of Delaware Application August 18, 1950, Serial No. 180,147

2 Claims. (Cl. 137—622)

This invention relates to valves and more particularly to valves for use in hydraulic systems.

It is an object of the invention to provide a valve structure wherein the seating elements are formed by integrally related oppositely disposed spherically shaped members.

It is a further object of the invention to provide a valve structure wherein the valve seats are formed in conical surfaces.

Another important object of the invention resides in the provision of integrally formed floatable seating elements which permit slight misalignments of the valve seats without affecting the valve performance.

A yet further object of the invention is to provide a valve characterized by the above features and hydraulically balanced.

Other objects and advantages reside in certain novel features of the construction, arrangement, and combination of parts which will be hereinafter more fully described and particularly pointed out in the specification and accompanying drawings wherein:

Figure 1 is a cross-sectional view of the valve; and

Figure 2 is a partially broken away view of Figure 1 showing in detail the seating relationship of the valve members with their associated valve seats.

Referring now to Figure 1, the reference numeral 12 designates a valve for use in a power braking system, not shown. The valve comprises a body 14, formed with a longitudinal bore 16 and having an inlet port 18, a working port 20, and a return port 22, opening into the bore at axially spaced intervals. Return port 22 is connected to inlet port 18 by suitable conduit means through reservoir 21, pump 23, check valve 25, and accumulator 27. After a certain degree of pressure is established in the accumulator, the check valve will shut until the accumulator pressure falls below said certain degree. Communicating with working port 20 is a single-acting cylinder and piston combination 29. The piston, as shown, is urged to the left by a suitable spring 31. One end of the bore 16 is provided with a closure member 24 having an enlarged end 26 which engages a shoulder 28 in the bore. A snap ring 30 fits into a groove 32 located in the bore adjacent the outer end of the closure member, to thereby securely retain the latter in position. The closure member is equipped with a groove 34 for receiving a sealing element 36, interposed between the bore and closure member, to prevent leakage from the bore to atmosphere. The closure member is machined at 38 to slidably receive one end of a valve guide 40, the other end of which is provided with a conical seat 41 for floatably supporting one end of a double ended valve member 42 comprising balls 44 and 46 securely fixed to opposite ends of a tubular element 48. The end of the valve guide adjacent the conical seat is formed with a shoulder 50 for engagement with one end of a spring 52 the other end of which abuts a washer 51 urged against the closure member 24.

A valve seating element 54 is located in the bore between the inlet and working ports to thereby divide the bore into a pair of chambers 53 and 55. Seating element 54 is equipped with a conical seat 56 on which the ball valve 44 seats under the action of the spring 52. A longitudinal passage 57 connects opposite ends of the valve guide to the same pressures; and this passage is, in turn, connected to a similar passage 59 in valve guide 40.

A plunger 58 is arranged in the other end of the bore, opposite said valve guide, for axial movement therein to control the flow of fluid between the ports. The plunger is formed with a longitudinal passage 60 and radial passages 62, only one of which is shown. An axially extending circumferentially located recess 64 in the plunger provides communication between the longitudinal passage 60 and the return port 22, at all times during plunger movement. A conical seat 66 is formed in the plunger at the end of passage 60 for engagement with the ball valve member 46; the latter of which in combination with the valve seat 66 controls flow between the working and return ports. Seals 68 and 70 are located on opposite sides of the recess 64 to prevent leakage from the interior of the bore past the plunger to the return port on the one hand, and from the interior of the bore past the plunger to atmosphere on the other hand.

In order that the valve be completely hydraulically balanced the effective seating areas formed by the balls 44 and 46 on the conical seats 41, 56, and 66 are equal. Each of these areas is in turn equal to the cross-sectional area of valve guide 40 and, consequently, the area of the end of the valve guide 40 which slides in the machined opening 38. The relationship between the seating areas and valve guide 40 is best shown in Figure 2 wherein the outer boundaries of the valve guide are extended to the right in dotted lines. It should be noted that these dotted lines run through the points of contact of the balls with their respective valve seats. Thus, the area encircled by each valve seat is identical.

Actuating means for the valve comprises an actuating sleeve 74 slidably carried in a housing 76 mounted to one end of the body 14 by bolts 77. The actuating sleeve 74 is connected by any suitable linkage, not shown, to a convenient place in a vehicle for actuation by the operator. A pair of oppositely disposed cups 78 and 80 fit over adjacent ends of the plunger and actuating sleeve. These cups 78 and 80 are equipped with flanges 82 and 84 respectively. A spring 86 is interposed between the cups with the ends of the spring carried by the cups and arranged in abutting relationship to the flanges 82 and 84. A bolt 88 passes through the cups and is provided with a threaded end 90 for receiving a nut 92. The nut is adjustable along the threaded portion for varying the preload on the spring 86. A spring 94, of sufficient strength to hold the actuating means off the end of plunger 58 when the brake valve is mounted for vertical operation, is interposed between the cup 78 and a washer 96 carried at the end of the bore 16. The inner diameter of the washer 96 is slightly smaller than the bore 16 to provide an overhang 98 against which a shoulder 100 of the plunger abuts to restrict the plunger movement to the right. With the shoulder 100 abutting the overhang 98 of the washer 96, the ball valve 46 is unseated from the conical seat 66 to thereby establish communication between the working and return ports 20 and 22 respectively.

The construction of this valve is such as to minimize the necessity of holding close tolerances in machining and close fits during assembly. This is done in part by making the valve guide 40 a separate piece from the double ended ball valve or dumbbell-shaped valve. Furthermore with the conical seats and ball members arranged as shown the fits between the parts need not be as fussy as heretofore experienced with the use of right-angled valve seats.

It is to be noted that the valve guide, dumbbell-shaped valve member, and plunger are all coaxially arranged and should be concentrically located if constructed in accordance with the prior art teachings. However, in the valve of the invention, these parts need not be held to the concentricities required of the prior art constructions. In the first place the use of a valve guide unattached to the valve members 44, 46 permits small amounts of misalignment therebetween. This represents a saving in cost of manufacture since the tolerances on the parts are wider. The inner end of the guide and the inner end of the plunger are equipped with conical seats, as aforementioned, which permits the ball valve members 44 and 46 to seat more readily under adverse conditions of assembly. This is due to the floating action of the ball valve members which allows either end to tilt with respect to the other end.

Operation of the valve device is as follows: assuming the valve to be in the position shown in Figure 1, fluid under pressure will enter chamber 55. This pressure will not urge valve guide 40 or valve member 44 to the right or left because of the aforesaid hydraulic balance. That is, the pressure responsive area on the right side of valve member 44 defined by conical seat 56 is equal to the pressure responsive area on the other side of the valve member defined by conical seat 41. Therefore, the equal pressures acting on these areas will be counter-balanced. Also, the pressure responsive area on the right side of shoulder 50 defined by seat 41 is equal to the area on the left defined by the cross sectional area of valve guide 40. The only force urging the valve guide and valve member to the right is that exerted by spring 52. Any pressure in chamber 53 exerted on the pressure effective area on the right end of valve member 46 (defined by the seating area of seat 66) will be counter-balanced by a like pressure on the left end of valve guide 40 because of the communication established by passages 57 and 59.

When actuating sleeve 74 is forced to the left to unseat valve member 44, spring 94 will be compressed first until cup 78 abuts the right end of plunger 58. The plunger will thereafter be forced to the left to seat valve member 46 on its associated conical seat 66 as shown in Figure 2. Further leftward movement of the plunger will unseat valve member 44 from seat 56 to allow the fluid under pressure to escape into chamber 53 and out working port 20 to cylinder and piston 29, thereby compressing spring 31. During this entire movement to the left, the only force opposing the movement of the plunger 58 is spring 52 on valve guide 40. When the valve member 44 is unseated from seat 56, the entire system will still be hydraulically balanced because the exact seating relationship of member 44 with seat 56 will be duplicated by engagement of member 46 with seat 66, the only difference being that this arrangement is further to the right. Note that pressure cannot build up to the left of valve guide 40 because of the communication established by passages 57 and 59 with the outlet port 22. The purpose of the heavy spring 86 is simply to produce "feel" on the part of the operator of the device after the valve member 44 has once been unseated.

Upon release of actuating sleeve 74, spring 52 will force valve members 44 and 46 to the right to seat member 44 on conical seat 56. Spring 94 will force spring 86, cups 78 and 80, and sleeve 74 to the right to thereby produce a spacing between cup 78 and the right end of plunger 58. Therefore, plunger 58 is free to move to the right to its position shown in Figure 1. The pressure in chamber 53 exerted by the now-compressed spring 31 acts on the left end of plunger 58 to unseat it from valve member 46 thereby permitting release of fluid from the cylinder and piston 29 through passages 60 and 62 and recess 64 to outlet port 22. This action completes the cycle of operation of the valve.

Although this invention has been described in connection with certain specific embodiments, the principles are susceptible of numerous other applications that will readily occur to persons skilled in the art.

Having thus described the various features of the invention, what I claim as new and desire to secure by Letters Patent is:

1. A valve mechanism comprising a body having a bore therein, first, second, and third ports in the bore, a closure member in one end of the bore, said closure member having an opening therein concentric with said bore, a plunger in the other end of the bore, a passage in the plunger for establishing communication between two of said ports, a valve seat in the passage, a valve seat in the bore interposed between a third port and one of said two ports, a dumbbell-shaped valve member arranged with its opposite ends adjacent the valve seats, means including said plunger for positioning said dumbbell-shaped valve member with respect to the valve seats to thereby control the flow between the ports, and a valve guide having one end slidably positioned in said opening and the other end formed with a conical seating surface for engagement with one end of said dumbbell-shaped valve member for supporting the same at its said one end whether seated against the valve seat in said bore or unseated therefrom, said dumbbell-shaped valve member and said valve guide being provided with longitudinal passages, the effective seating areas of the dumbbell-shaped valve member on said valve seat in the passage, said valve seat in the bore, the valve seat on said other end of the valve guide, and the cross-sectional area of said opening being the same, to thereby provide a hydraulically balanced valve irrespective of the position of said dumbbell-shaped valve member.

2. A valve mechanism comprising a body with a bore therein, an inlet port in the bore adapted to be connected to a source of continuous pressure, separate working and return ports in the bore, a first conical valve seat interposed between the inlet and working ports, a second conical valve seat interposed between the working and return ports, a dumbbell-shaped valve member arranged to seat on said valve seats, a closure member having an opening therein within said bore, valve guide means slidably positioned in said opening for floatably supporting one end of said dumbbell-shaped valve member against said first seat, said valve guide means being provided with a third conical seating surface formed for engagement with said one end of the valve member to permit misalignment between the valve member and said valve seats, said valve member and valve guide means being provided with longitudinal passages communicating with each other, the effective seating areas of said valve member on said first and second valve seats, said third seating surface, and the cross-sectional area of said valve guide means being equal, thereby providing a hydraulically balanced valve, and means for unseating the dumbbell-shaped valve member from said first seat and seating it on the second seat, said last-mentioned means including a passage in which said second valve seat is located, said last mentioned means being normally positioned in the bore so that the other end of said dumbbell-shaped valve is unseated from said second seat.

References Cited in the file of this patent

UNITED STATES PATENTS

| | | |
|---|---|---|
| 272,040 | Graham | Feb. 13, 1883 |
| 1,927,700 | Dickinson | Sept. 19, 1933 |
| 2,266,817 | Schober | Dec. 23, 1941 |
| 2,395,401 | Eaton | Feb. 26, 1946 |
| 2,406,284 | Fitch | Aug. 20, 1946 |
| 2,416,091 | Fitch | Feb. 18, 1947 |
| 2,452,647 | Gagen | Nov. 2, 1948 |
| 2,455,030 | Vorech | Nov. 30, 1948 |
| 2,470,746 | Schultz | May 17, 1949 |

FOREIGN PATENTS

| | | |
|---|---|---|
| 4,972 | Great Britain | Mar. 14, 1892 |